May 25, 1926.

N. K. PETSONIS 1,585,872

DIRECTION SIGNAL FOR MOTOR VEHICLES

Filed June 22, 1925    2 Sheets-Sheet 1

WITNESSES

Inventor
NICK K. PETSONIS

By Richard B. Owen
Attorney

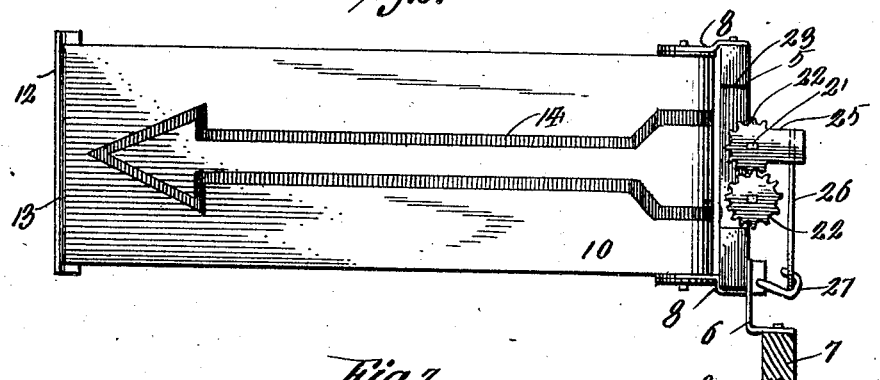
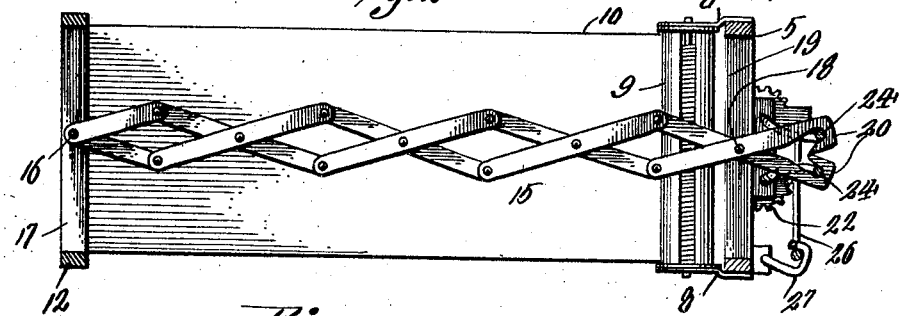
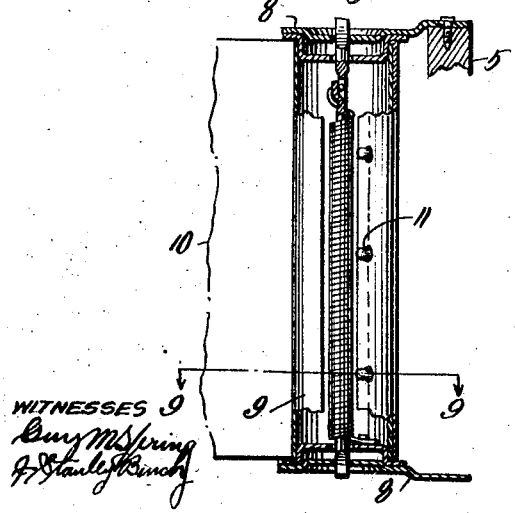

Patented May 25, 1926.

1,585,872

UNITED STATES PATENT OFFICE.

NICK K. PETSONIS, OF CHEHALIS, WASHINGTON.

DIRECTION SIGNAL FOR MOTOR VEHICLES.

Application filed June 22, 1925. Serial No. 38,825.

This invention relates to certain new and useful improvements in direction signals for motor vehicles, and has more particular reference to a mechanical signaling device adapted to be actuated by the driver of a vehicle for indicating his intention to steer the vehicle from a straight line of travel.

The primary object of the invention is to provide a signaling device of the above kind which is extremely simple and durable in construction as well as efficient in operation.

Another object of the invention is to provide a direction signaling device of the above character which will occupy a relatively small space when in its normal inoperative condition, and which will not mar the appearance of the vehicle upon which it is used.

A further object of the invention is to provide a signaling device of the above kind which may be expeditiously and easily operated to indicate the intention of the driver of a vehicle to turn, and which embodies means for maintaining the device in signaling condition so that both hands of the driver will be free for attention to steering and other operations.

Figure 2:
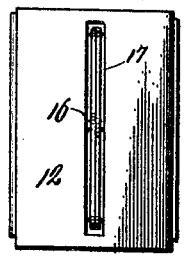
Figure 1:
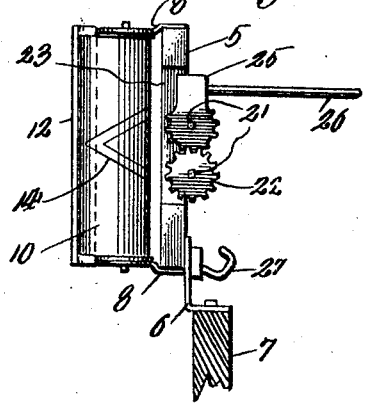
Figure 3:
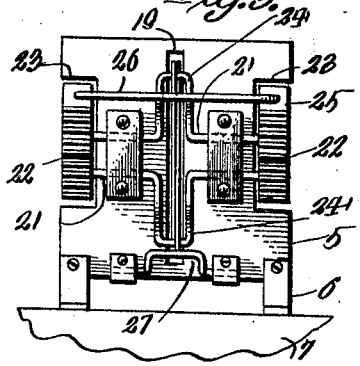
Figure 4:
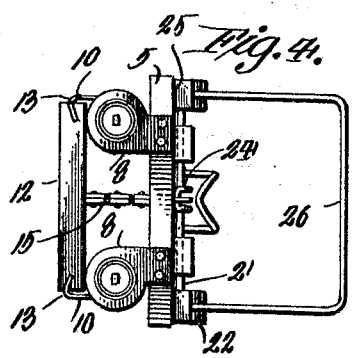
Figure 5:
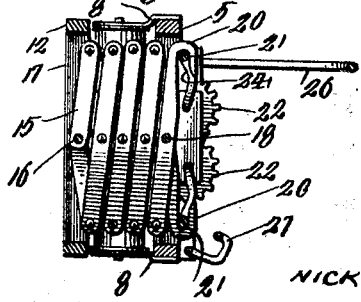

With the above general objects in view, and others that will become apparent as the nature of the invention is better understood, the same consists in the novel form, combination and arrangement of parts hereinafter more fully described, shown in the accompanying drawings and claimed:

In the drawings, wherein like reference characters indicate corresponding parts throughout the several views, Figure 1 is a side elevational view of a signaling device constructed in accordance with the present invention and in normal inoperative condition, Figure 2 is an end elevational view looking towards the right of Figure 1, with parts omitted, Figure 3 is a view similar to Figure 2 looking towards the left of Figure 1, Figure 4 is a top plan view of the device shown in Figure 1, Figure 5 is a substantially central vertical longitudinal sectional view of the device shown in Figure 1, Figure 6 is a view similar to Figure 1 showing the signaling device in extended signaling condition, Figure 7 is a view similar to Figure 5 of the device as shown in Figure 6, Figure 8 is an enlarged fragmentary view partly in elevation and partly in section showing one of the spring rollers with associated parts, and Figure 9 is a horizontal section taken substantially upon line 9—9 of Figure 8.

Referring more in detail to the drawings, the form of the invention herein shown embodies a supporting plate 5 adapted to be suitably rigidly secured in a vertical position at one side of the vehicle body adjacent the driver's seat by means of brackets 6. These brackets are preferably of angular form and embody upstanding arms rigidly attached to the lower corners of the plate 5 and horizontal arms rigidly attached to the desired part of the vehicle body, such as the door 7 of the latter.

Pairs of brackets 8 are rigidly secured to the supporting plate 5, and the brackets of each pair are preferably secured respectively to the upper and lower edges of the plate 5 so as to project outwardly as shown clearly in Figures 1 and 4. Each pair of brackets 8 supports a spring roller 9 adjacent a side edge of the plate 5 and in a vertical position so that the pair of rollers 9 are disposed in spaced parallel relation. These spring rollers 9 are similar in general construction to those commonly employed for window shades, and one end of an elongated flexible strip 10 is attached to each roller, preferably by means of hooks indicated at 11 in Figure 8. The flexible strips 10 are normally wound upon the rollers 9 and have their other ends suitably secured to the adjacent side edges of a spacing plate 12 as indicated at 13. As shown clearly in Figure 6, the outer surfaces of the strips 10 are provided with suitable signaling indicia such as arrows 13 which, when the strips are extended as shown in Figure 6, will be clearly visible and horizontally disposed so as to point outwardly and clearly indicate the intention of the driver to turn. It is thus apparent that the strips are normally wound upon the rollers so that the signaling indicia is not visible and the spacing plate 12 is disposed adjacent the rollers as shown clearly in Figure 4. It is also apparent that the flexible strips may be simultaneously extended or projected outwardly by unrolling the same from the rollers 9 if the spacing plate 12 is forced outwardly.

Manually operable means is provided for forcing the plate 12 outwardly so as to unroll the strips 10 from the rollers 9 to extended or projected signaling position, and this means preferably embraces the use of lazy-tongs as indicated at 15. As shown clearly in Figure 7, the outer end of the lazy-tong element 15 is pivotally attached as at 16 to the plate 12 and within a vertical central elongated slot 17 provided in the latter, while the intermediate portions of the inner end levers of the lazy-tongs are pivoted as at 18 within a central vertical elongated slot 19 of the supporting plate 5. The lazy-tongs 15 are thus disposed midway between the strips 10 and by the provision of the slots 17 and 19, the ends of the lazy-tongs 15 may be allowed to enter said slots 17 and 19 as shown clearly in Figure 5 so that the plate 12 may move as far as possible toward the plate 5 and thus result in the device normally occupying a most compact condition.

The inner end portions of the innermost levers of the lazy-tongs 15 extend inwardly past the supporting plate 5 and terminate in hooks 20 which face each other.

Journaled in a horizontal position and in spaced parallel relation upon the inner surface of the supporting plate 5 are a pair of crank shafts 21, the ends of which are rotatably geared together by means of intermeshing spur gears 22 located in notches 23 provided in the side edges of the supporting plate 5 as shown in Figure 3.

The intermediate portions of the shafts 21 are provided with cranks 24, the crank of the upper shaft normally projecting upwardly and that of the lower shaft normally projecting downwardly as clearly shown in Figure 3. These cranks 24 are engaged by the hooks 20 of the lazy-tongs 15 so that when the crank shafts 21 are rotated the lazy-tongs will be extended as shown in Figure 7.

The upper ones of the gears 22 are provided with arms 25 which normally project upwardly, and rigid with and connecting these arms 25 is a bail-like handle 26 that normally projects inwardly in a horizontal position.

A suitable hook shaped catch 27 is mounted on the lower portion of the supporting plate 5 in the path of movement of the intermediate portion of the handle 26. The gears 22 are so proportioned as to sufficiently rotate the crank shafts 21 for completely extending the lazy-tongs 15 when the handle 26 is swung downwardly to a substantially vertical position as shown clearly in Figures 6 and 7, and when in this position, the handle 26 will be maintained in downwardly swung position by means of the catch 27, thus leaving the hands of the driver free immediately for attention to the vehicle, such as steering, shifting gears and the like. When the signaling operation is completed as outlined above, and the vehicle is again continued in a straight line of travel, the catch 27 may be manually released from the handle 26, whereupon the strips 10 will be automatically rewound upon the rollers 9 by means of the springs of the latter so that the lazy-tongs 15 will be contracted and the signaling indicia no longer exposed.

From the foregoing description it is believed that the construction and operation as well as the advantages of the present invention will be readily understood and appreciated by those skilled in the art.

Minor changes may be made without departing from the spirit and scope of the invention as claimed.

What I claim as new is:—

1. A direction signal including a support, a pair of spring rollers mounted in a vertical position on said support, a flexible strip normally wound upon each roller and having normally concealed signaling indicia thereon, and manually operable means arranged between said strips and said rollers for unwinding said strips from said rollers against the action of the springs of the latter and in an outwardly projecting flat condition for exposing said signaling indicia, a spacing plate having the outer ends of the strips secured to the side edges thereof, said strip unwinding means embodying lazy-tongs carried by the support and attached to the spacing plate, said lazy-tongs having hooks upon the inner ends of the inner levers thereof, a pair of crank shafts journalled upon the support and rotatably geared together, the cranks of said crank shaft being engaged by the hooks of the lazy-tongs, and a handle rigid with the gears of the upper crank shaft.

2. A direction signal including a support, a pair of spring rollers mounted in a vertical position on said support, a flexible strip normally wound upon each roller and having normally concealed signaling indicia thereon, and manually operable means arranged between said strips and said rollers for unwinding said strips from said rollers against the action of the springs of the latter and in an outwardly projecting flat condition for exposing said signaling indicia, a spacing plate having the outer ends of the strips secured to the side edges thereof, said strip unwinding means embodying lazy-tongs carried by the support and attached to the spacing plate, said lazy-tongs having hooks upon the inner ends of the inner levers thereof, a pair of crank shafts journalled upon the support and rotatably geared together, the cranks of said crank shaft being engaged by the hooks of the lazy-tongs, and a handle rigid with the gears of the upper crank shaft and a catch carried by the support engageable with the handle for maintaining the latter in position with the lazy-tongs in extended condition.

3. A direction signal including a support, a projectable signaling element embodying lazy-tongs carried by the support, said lazy-tongs having hooks upon the inner ends of the inner levers thereof, a pair of crank shafts journaled upon the support and rotatably geared together, the cranks of said crank shafts being engaged by the hooks of the lazy-tongs, and means to facilitate manual turning of one of said crank shafts.

4. A direction signal including a support, a spring roller mounted in a vertical position on said support, a flexible strip normally wound upon said roller and having normally concealed signaling indicia thereon, and manually operable means arranged beside said strip for unwinding the same from said roller against the action of the spring of the latter and in an outwardly projecting flat condition for exposing said signaling indicia, a plate having the outer end of the strip secured to the same, said strip unwinding means embodying lazy-tongs carried by the support and attached to the plate, said lazy-tongs having hooks upon the inner ends of the inner levers thereof, a pair of crank shafts journaled upon the support and rotatably geared together, the cranks of said crank shafts being engaged by the hooks of the lazy-tongs, and means to facilitate manual turning of one of said crank shafts.

In testimony whereof I affix my signature.

NICK K. PETSONIS.